US012695535B2

(12) United States Patent
Djuhera et al.

(10) Patent No.: US 12,695,535 B2
(45) Date of Patent: Jul. 28, 2026

(54) EDGE-CENTRIC RESILIENCE WITH PROACTIVE JAMMER-RESILIENT OPTIMIZATION

(71) Applicant: International Business Machines Corporation, Armonk, NY (US)

(72) Inventors: Aladin Djuhera, Dachau (DE); Swanand Ravindra Kadhe, San Jose, CA (US); Fernando Luiz Koch, Palm Beach Gardens, FL (US); Alecio Pedro Delazari Binotto, Munich (DE); Martin Junghans, Karlsruhe (DE); Heiko H. Ludwig, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 18/592,682

(22) Filed: Mar. 1, 2024

(65) Prior Publication Data

US 2025/0279844 A1 Sep. 4, 2025

(51) Int. Cl.
*H04K 3/00* (2006.01)

(52) U.S. Cl.
CPC ................. *H04K 3/94* (2013.01); *H04K 3/22* (2013.01); *H04K 2203/18* (2013.01)

(58) Field of Classification Search
CPC ......... H04K 3/94; H04K 3/22; H04K 2203/18
See application file for complete search history.

(56) References Cited

U.S. PATENT DOCUMENTS

| | | | | |
|---|---|---|---|---|
| 9,838,151 | B1 * | 12/2017 | Stockmaster | H04K 3/22 |
| 2015/0350228 | A1 * | 12/2015 | Baxley | H04L 63/1483 726/23 |
| 2017/0279836 | A1 * | 9/2017 | Vasseur | H04L 63/1425 |
| 2020/0153535 | A1 * | 5/2020 | Jayaweera Kankanamge | H04K 3/22 |
| 2022/0014923 | A1 * | 1/2022 | Banjade | H04K 3/22 |
| 2024/0045075 | A1 * | 2/2024 | Dhaliwal | H04K 3/90 |
| 2025/0279844 | A1 * | 9/2025 | Djuhera | H04K 3/22 |

FOREIGN PATENT DOCUMENTS

WO WO-2023153990 A1 * 8/2023 ......... H04L 63/1408

OTHER PUBLICATIONS

Fettweis et al., "6G: the Personal Tactile Internet—and Open Questions for Information Theory", date of current version Feb. 4, 2022 , Digital Object Identifier 10.1109/MBITS.2021.3118662, 12 pages.

Fettweis et al., "On 6G and Trustworthiness", Apr. 2022, DOI: 10.1145/3512996, 2 pages.

(Continued)

*Primary Examiner* — Md K Talukder
(74) *Attorney, Agent, or Firm* — Michael O'Keefe

(57) ABSTRACT

According to one embodiment, a method, computer system, and computer program product for distributed edge resilience enhancement is provided. The embodiment may include identifying an adversarial jammer is causing an impact on a wireless system. The embodiment may also include generating a risk assessment of impact caused by the adversarial jammer to a user. The embodiment may further include identifying an action to apply based on the risk assessment. The embodiment may also include performing the identified action.

20 Claims, 4 Drawing Sheets

(56) References Cited

OTHER PUBLICATIONS

Marti et al., "Mitigating Smart Jammers in Multi-User MIMO", arXiv:2208.01453v3 [cs.IT] Feb. 15, 2023, 16 pages.
Marti et al., "Mitigating Smart Jammers in MU-MIMO via Joint Channel Estimation and Data Detection", arXiv:2201.08778v1 [cs.IT] Jan. 21, 2022, 7 pages.
Marti et al., "Universal MIMO Jammer Mitigation via Secret Temporal Subspace Embeddings", arXiv:2305.01260v2 [cs.IT] Dec. 8, 2023. 8 pages.
Mukherjee et al., "Jamming Importance for 6G Terrahertz Networks", © 2022 IEEE, DOI: 10.1109/MILCOM55135.2022.10017817, 5 pages.
Uprety et al., "Reinforcement Learning for IoT Security: a Comprehensive Survey", arXiv:2102.07247v1 [cs.LG] Feb. 14, 2021, 14 pages.
Vaishnavi et al., "A Survey on Jamming Techniques in Physical Layer Security and Anti-Jamming Strategies for 6G" © 2021 IEEE, DOI: 10.1109/ICT52184.2021.9511465, 6 pages.
Yang et al., "Towards Zero Touch Networks: Cross-Layer Automated Security Solutions for 6G Wireless Networks", Aug. 16, 2023 / Aug. 22, 2023, https://dx.doi.org/10.36227/techrxiv.23971707.v1, 24 pages.

* cited by examiner

EDGE-CENTRIC RESILIENCE WITH PROACTIVE JAMMER-RESILIENT OPTIMIZATION

BACKGROUND

The present invention relates generally to the field of computing, and more particularly to edge computing.

Edge computing relates to a distributed computing landscape that brings computational power and data storage closer to the location of need, which improves response times and conserves bandwidth compared to such computing landscapes as cloud computing. Distinguishable from the centralized arrangement of cloud computing where the processing power and storage are located at remote locations, edge computing is a decentralized architecture where smaller chunks of processing power are located nearer to where they are needed thereby significantly reducing latency, providing real-time data analysis, and effectively analyzing large amounts of data.

There are many applications for edge computing. With respect to the Internet of Things (IoT), edge computing allows for faster processing and delivery speeds for deployed devices, such as smart devices and autonomous vehicles. In telecommunications, edge computing supports the requirements necessary for 5G networks (e.g., high speeds and low latency). Businesses utilize edge computing to process sensitive information locally without requiring transmission of that data to the cloud for processing, which can compromise data security.

SUMMARY

According to one embodiment, a method, computer system, and computer program product for distributed edge resilience enhancement is provided. The embodiment may include identifying an adversarial jammer is causing an impact on a wireless system. The embodiment may also include generating a risk assessment of impact caused by the adversarial jammer to a user. The embodiment may further include identifying an action to apply based on the risk assessment. The embodiment may also include performing the identified action.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
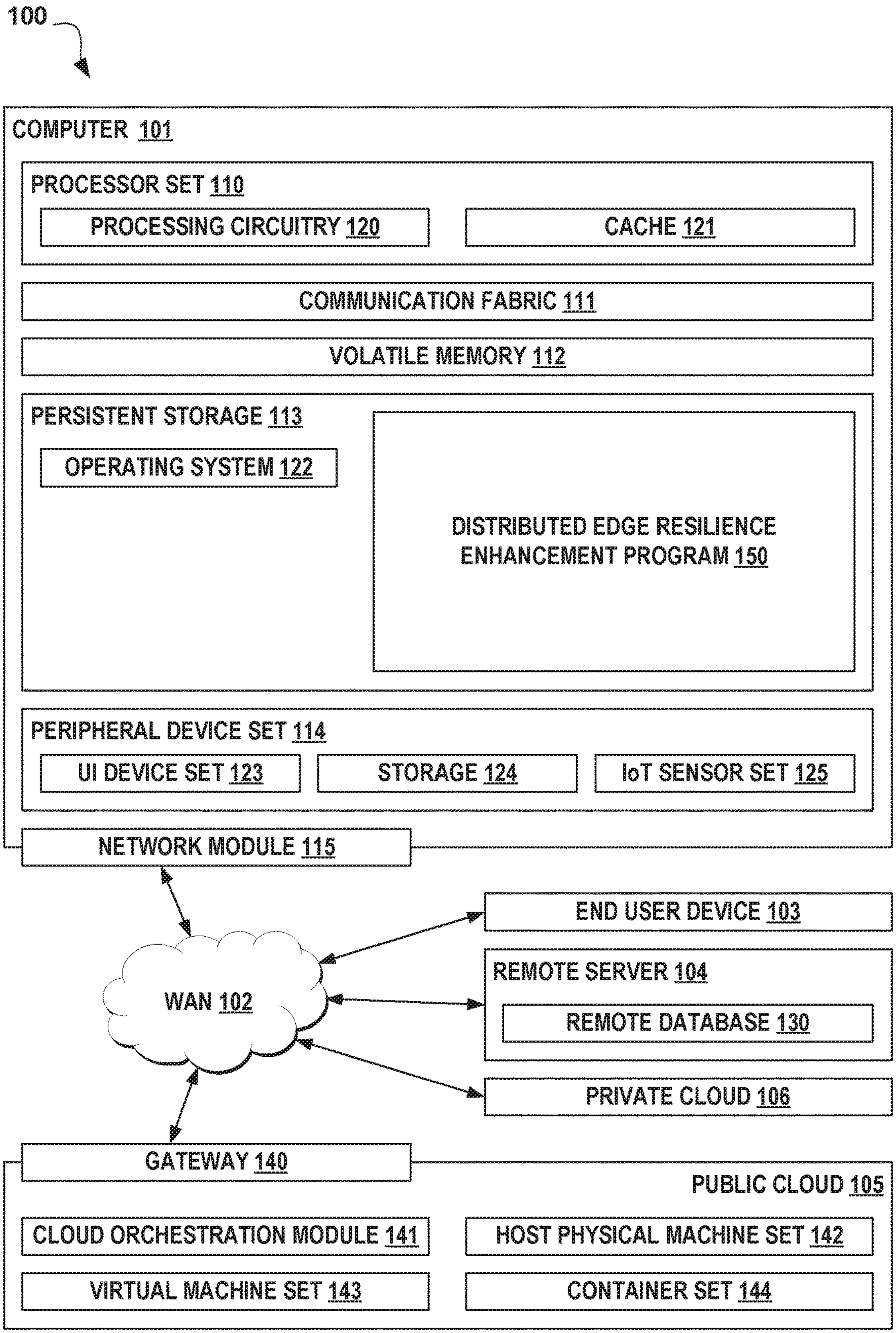
FIG. 1 illustrates an exemplary networked computer environment according to at least one embodiment.

According to an aspect of the invention, there is provided a method for smart defense scheduling for adversarial jamming. The method may include identifying an adversarial jammer is causing an impact on a wireless system. The embodiment may also include generating a risk assessment of impact caused by the adversarial jammer to a user. The embodiment may further include identifying an action to apply based on the risk assessment. The embodiment may also include performing the identified action. By incorporating accelerated fine-tuning capabilities, artificial intelligence entities may experience streamlined processes that reduce time and resource requirements for large foundation model fine-tuning. Moreover, the collaborative knowledge sharing enabled by fine-tuned models within the same foundational model family may offer a competitive edge to users, which may result in quicker learning and improved model performance.

In embodiments, the above method may further generate a reinforcement learning training environment, perform reinforcement learning training during an exploration phase, and perform reinforcement learning deployment during an exploitation phase. Through incorporation of reinforcement learning training, both the machine learning aspects and the physical layer parameters may be trained to resist active adversarial jamming attacks.

In embodiments of the above method, identifying the adversarial jammer may further include generating a preliminary characterization of the adversarial jammer based on a detected effect on the wireless system caused by the adversarial jammer. The technical effect of the preliminary characterization may be seen in initial information about the adversarial jammer being identified based on the impact to the wireless system.

In embodiments of the above method, the risk assessment considers an attack probability to a user utilizing the wireless system, adversarial jammer strength, task priority determined through machine learning of prior attacks, and task responsibility determined through machine learning of prior attacks. The detailed criteria considered in the risk assessment aim to provide an accurate assessment of the risks posed by the adversarial jammer.

In embodiments of the above method, the action may be identified through a rule-based system or a reinforced learning-based agent. The implementation of either a rule-based system or a reinforced learning-based agent provide the advantage of a choice in identification methods that may provide varying results in detecting adversarial jamming.

In embodiments of the above method, the action may be selected from a group consisting of delaying training, applying countermeasures, pre-emptively secure users, and continue as is. Selection of the action to be taken by the system under different circumstances allows for a customization of the action to the specific circumstances, which might not be applicable for a different situation.

In embodiments, the above method may further store data from the reinforcement learning training and reinforcement learning deployment in a repository, where the data is selected from a group consisting of rules, policies, metadata, and other historical data. This storage of information may improve the machine learning training thus resulting in higher accuracy in future iterations.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to edge computing. The following described exemplary embodiments provide a system, method, and program product to, among other things, bridge artificial intelligence and wireless edge networks to enhance distributed edge artificial intelligence system resilience against adversarial jamming. Therefore, the present embodiment has the capacity to improve the technical field of edge computing by enhancing the foundation models as a service (FMaaS) platform through fine-tuning capabilities aimed at streamlining processes and reducing time and resource requirements for large foundation model fine-tuning. This results in not only cost savings but also boosts overall productivity for a system. Moreover, the collaborative knowledge sharing enabled by fine-tuned models within the same foundation model family results in quicker learning and improved model performance. Furthermore, some embodiments may revolutionize foundation model offerings that are tailored to privacy-sensitive use cases. The integration of large machine learning models as described may enhance the viability and effectiveness of such solutions in challenging wireless edge environments.

As previously described, edge computing relates to a distributed computing landscape that brings computational power and data storage closer to the location of need, which improves response times and conserves bandwidth compared to such computing landscapes as cloud computing. Distinguishable from the centralized arrangement of cloud computing where the processing power and storage are located at remote locations, edge computing is a decentralized architecture where smaller chunks of processing power are located nearer to where they are needed thereby significantly reducing latency, providing real-time data analysis, and effectively analyzing large amounts of data.

There are many applications for edge computing. With respect to the Internet of Things (IoT), edge computing allows for faster processing and delivery speeds for deployed devices, such as smart devices and autonomous vehicles. In telecommunications, edge computing supports the requirements necessary for 5G networks (e.g., high speeds and low latency). Businesses utilize edge computing to process sensitive information locally without requiring transmission of that data to the cloud for processing, which can compromise data security.

The security of edge clients against adversarial jamming attacks is a pressing concern. Adversarial jamming relates to a disruption of communication between legitimate transceivers, and their impact is especially profound in the context of distributed artificial intelligence systems. The artificial intelligence systems offer services, such as distributed inference and federated learning, while prioritizing reduced latency and heightened privacy. The challenge to protect against adversarial jamming becomes more pronounced in distributed artificial intelligence setups that operate over cellular wireless networks, where adversarial jamming can severely hamper model training and even result in service denial when the jamming intensity is substantial.

While various techniques exist for countering jammers at the physical later, addressing sudden or anticipated jamming incidents in the context of a distributed and potentially critical artificial intelligence system remains a challenge. As such, it may be advantageous to, among other things, develop a comprehensive approach that combines considerations of distributed artificial intelligence training and efficient wireless scheduling. Such an approach should determine optimal anti-jamming strategies, enable rapid proactive deployment of defenses, and cater to scenarios where jamming is already occurring or expected.

According to at least one embodiment, a distributed edge resilience enhancement program may be centered around edge-in-cloud architecture that aims to provide jammer-resilient distributed artificial intelligence training in cellular wireless edge networks. The distributed edge resilience enhancement program may provide automatic decision and scheduling mechanisms to determine and schedule intelligent defense strategies in the presence of adversarial jamming. The distributed edge resilience enhancement program may also provide pre-emptive defense selection for preemptive selection of smart anti-jamming and defense schemes in upper communication system layers. The distributed edge resilience enhancement program may provide reinforcement learning-based joint optimization of wireless physical layer parameters and distributed artificial intelligence system parameters, which may be applied when jamming targets an ongoing training pipeline.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as distributed edge resilience enhancement program 150. In addition to distributed edge resilience enhancement program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and distributed edge resilience enhancement program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in distributed edge resilience enhancement program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in distributed edge resilience enhancement program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, the distributed edge resilience enhancement program 150 may ensure jammer-resilient distributed artificial intelligence training as well as proactive smart scheduling of potential anti-jamming defense mechanisms within a cellular Internet of Things (IoT)-Edge-Cloud continuum by combing three techniques (i.e., smart defense mechanisms, joint parameter optimization, and preemptive upper layer defenses). The distributed edge resilience enhancement program 150, when implementing smart defense mechanisms, may infer, apply, and decide on intelligent mechanisms in response to adversarial jamming, whether such jamming attacks are occurring in real-time or anticipated at some point in the future. The distributed edge resilience enhancement program 150, when performing joint parameter optimization, may utilize reinforced learning for policy making. Such an approach jointly optimizes physical and artificial intelligence model parameters during training, which may be crucial when active jamming aims to hinder artificial intelligence model training. Additionally, the distributed edge resilience enhancement program 150, when performing upper layer defenses, may encompass proactive upper-layer defense mechanisms in wireless edge environments, including techniques such as frequency band switching and frequency hopping, which may be beneficial when anticipating jamming due to mobile jammers, moving devices, or changes in wireless parameters.

Additionally, prior to initially performing any actions, the distributed edge resilience enhancement program 150 may perform an opt-in procedure. The opt-in procedure may include a notification of the data the distributed edge resilience enhancement program 150 may capture and the purpose for which that data may be utilized by the distributed edge resilience enhancement program 150 during data gathering and operation. Furthermore, notwithstanding depiction in computer 101, the distributed edge resilience enhancement program 150 may be stored in and/or executed by, individually or in any combination, end user device 103, remote server 104, public cloud 105, and private cloud 106. The distributed edge resilience enhancement method is explained in more detail below with respect to FIGS. 2-4.

Figure 2:
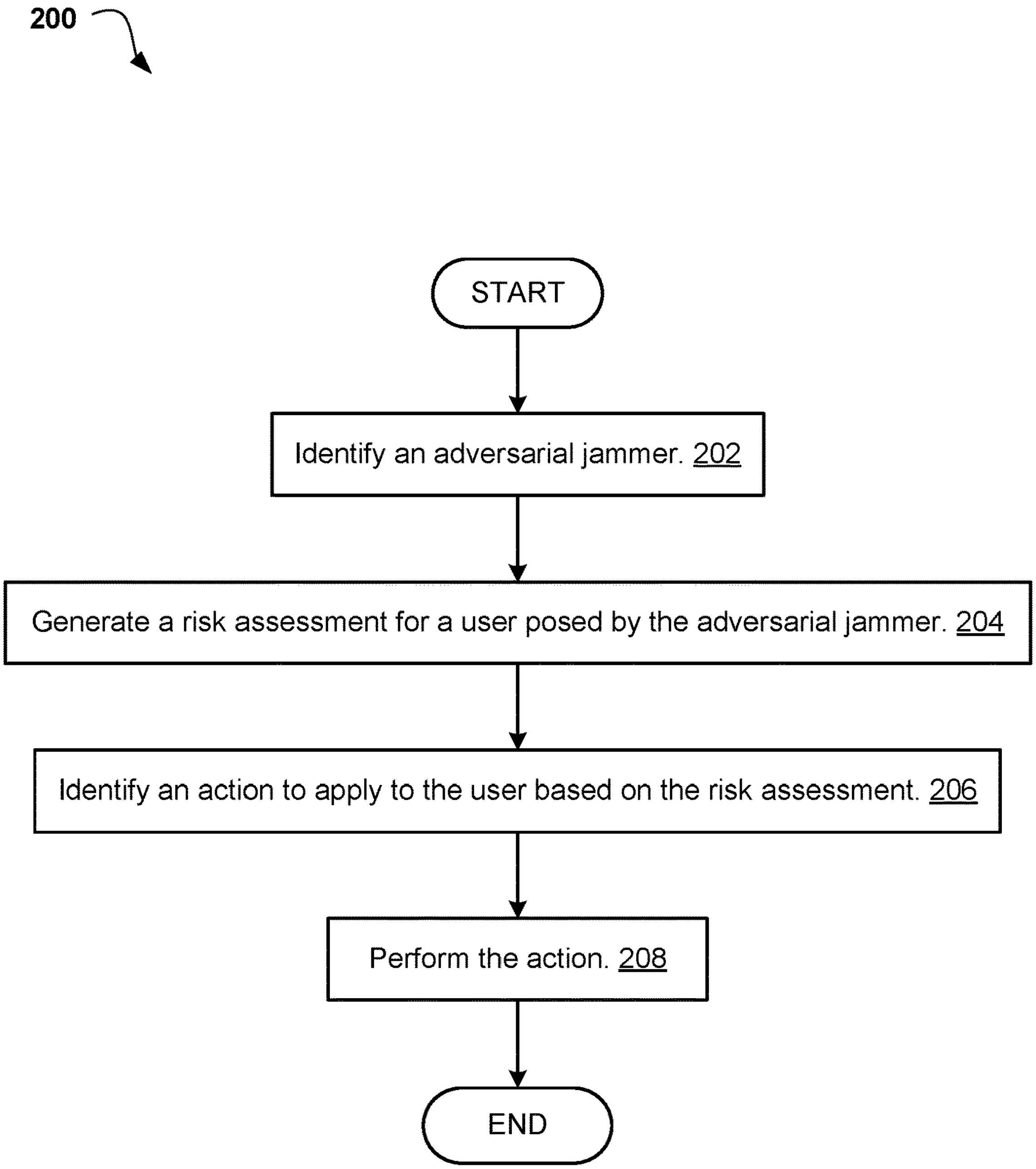
FIG. 2 illustrates an operational flowchart for a smart defense scheduling for adversarial jamming process according to at least one embodiment.

Referring now to FIG. 2, an operational flowchart for a smart defense scheduling for adversarial jamming process 200 according to at least one embodiment. The distributed edge resilience enhancement program 150 may implement a smart scheduling operation which determines which countermeasures to apply by employing a detection, decision, and action module. At 202, the distributed edge resilience enhancement program 150 identifies an adversarial jammer. The distributed edge resilience enhancement program 150 may understand and monitor information and measurements of a wireless system and determine disruptions or anomalies within the monitored information that indicate an adversarial jammer is affecting the wireless network. The distributed edge resilience enhancement program 150 may identify various indicators that an adversarial jammer is currently affecting a wireless network including, but not limited to, a sudden drop in signal-to-noise ratio and signal-to-interference-plus-noise ratio, an unexpected increate in bit rate error, a drop in throughput that is sudden and/or unexplained, unusual patterns or anomalies in signal processing (e.g., unexplained frequency shifts or modulation errors identified through baseline measurement comparisons, continuous monitoring and system updates, and spectrum analysis results), and identifying signals that persistently exhibit higher energy levels than typical communications. Furthermore, the distributed edge resilience enhancement program 150 may utilize one or more advanced analysis techniques to pinpoint an adversarial jammer's location to facilitate physical mitigation efforts, such as cross referencing with known devices in a wireless network (e.g., comparing real-time traffic and anomaly signatures against a database of known user profiles), rapid fluctuations in channel state information (e.g., sudden, unexplained changes in channel state information that cannot be attributed to typical physical or network conditions), and device feedback results (e.g., feedback from devices experiencing extreme interference or performance degradation).

In one or more embodiments, the distributed edge resilience enhancement program 150 may also generate a preliminary characterization of the adversarial jammer based on the detected effect on the wireless system or wireless network caused by the adversarial jammer. For example, the distributed edge resilience enhancement program 150 may determine that the effect on the signal strength of the wireless network caused by the adversarial jammer would only be possible with a specific class of jammer and, thus, other classes of adversarial jammers may be ruled out as the cause of the impact to signal strength.

Then, at 204, the distributed edge resilience enhancement program 150 generates a risk assessment for a user posed by the adversarial jammer. As part of the detection, the distributed edge resilience enhancement program 150 may assess the risk or impact to each user caused by the adversarial jammer. The risk may depend on the attack probability to a user utilizing the wireless system, jammer strength, task priority determined through machine learning of prior attacks, and task responsibility determined through machine learning of prior attacks.

Task priority may relate to prioritizing some tasks over others based on various metrics. For example, some tasks may only be executed once or may be key to a bigger system. Priority scheduling may occur within a system, for example in a central processing unit/system level or regarding the sensitivity of the machine learning task. Additionally, some distributed learning may illustrate the importance of some tasks over others as defined by a service table or similar entity.

Task responsibility may relate an attack probability as a measure of how likely a client is to be attacked by an adversarial jammer due to the proximity of the jammer towards that network or device, the increase in jamming power to the network or device, a potential movement of the jammer towards specific users, etc.

In one or more embodiments, the distributed edge resilience enhancement program 150 may detect the adversarial jammer and assess risk to users through a rule-based system. The distributed edge resilience enhancement program 150 may be capable of defining a threat model of a wireless network, identify vulnerability points, quantify jammer impact factors, and calculate attack probabilities. The threat model may be defined using various jammer characteristics (e.g., type, power, mobility pattern, and frequency range), user distribution (e.g., spatial distribution of users, their mobility patterns, and communication requirements), and network characteristics (e.g., type of network, topology, frequency bands used, and resilience measures in place). The distributed edge resilience enhancement program 150 may identify vulnerability points through high density user areas (e.g., locations with a high concentration of users they may typically be more attractive targets for jammers) and critical network infrastructure (e.g., base stations or nodes that, if jammed, may affect a large number of users or critical services). The distributed edge resilience enhancement program 150 may further quantify jamming impact factors, such as signal coverage and propagation (e.g., the effective range of the jammer considering its power and the propagation environment), user mobility (e.g., the likelihood of users entering or leaving the jammer's effective range over time), and jammer mobility (e.g., whether the jammer is moving and the probability it will come into proximity to high-value targets or high-density user areas). Furthermore, the distributed edge resilience enhancement program 150 may calculate attack probability using various criteria, such as temporal and spatial likelihood (e.g., combination of the jammer's mobility pattern and signal characteristics with user distribution and mobility to estimate the probability of attack at different times and locations), network exposure (e.g., assess the networks vulnerability based on the criticality and accessibility of infrastructure the jammer could target), and adaptive behaviors (e.g., incorporate the potential for both the network and the jammer to adapt strategies over time, such as dynamic frequency hopping by the network and changing attack patterns by the jammer).

Additionally, the distributed edge resilience enhancement program 150 may be augmented by historical data and time-series model predictions. The distributed edge resilience enhancement program 150 may utilize mathematical modeling; simulations and predictive analytics; various machine learning models, such as, but not limited to, time series analysis for predictive modeling autoregressive integrated moving average (ARIMA), long short-term memory (LSTM), seasonal decomposition of time series; and spatial analysis and prediction, such as but not limited to, convolutional neural networks (CNNs) and graph neural networks (GNNs).

Next, at 206, the distributed edge resilience enhancement program 150 identifies an action to apply to the user using a decision module based on the risk assessment. The distributed edge resilience enhancement program 150 may identify the action to apply using a rule-based system, a reinforced learning-based agent, or another automation framework. Additionally, the distributed edge resilience enhancement program 150, through the decision module, may be augmented to identify the action by historical data, prior heuristics, expert opinions, system consultants, or other feedback, such as success/failure outcomes. The distributed edge resilience enhancement program 150 may utilize various actions including, but not limited to, delaying training of a distributed foundation model, applying countermeasures, pre-emptively secure users, and continue as is. Applying countermeasures may relate to traditional implementations in the protocol stack such as spectrum analysis and signal profiles (e.g., use detailed spectrum analysis to identify unauthorized high-energy signals indicative of jamming or implement frequency hopping or spread spectrum techniques to move communications to less congested or unaffected frequences thus making further disruption to the network difficult for jammers), adjust transmit power (e.g., increase the power of legitimate signals to overcome the jamming signal, if feasible, without violating regulatory limits or creating undue interference), rapid fluctuations in channel state information and bit rate error monitoring, MAC protocol adjustments, anomaly detection through continuous monitoring, cross-reference with known devices, throughput and bit rate error analysis, high-level anomaly detection and response, device feedback utilization, adaptive strategies (e.g., implementation of cross-layer defense mechanisms that allow for rapid adaptation across multiple OSI layers), and collaborative defense (e.g., encouraging collaboration between network elements, such as base stations and routers).

The distributed edge resilience enhancement program 150 may also, or alternatively, determine to delay training and resume at a later time if the current jamming is very powerful and mitigation techniques will not result in optimal performance. Thus, the distributed edge resilience enhancement program 150 may place the training on hold until the jamming ceases or a satisfactory mitigation technique is identified. The period of time delay utilized by the distributed edge resilience enhancement program 150 may be preconfigured by an administrator for a given jammer type or category.

The distributed edge resilience enhancement program 150 may apply countermeasures when the jamming exceeds a threshold level of impact on the wireless system (e.g., signal strength is reduced by a preconfigured percentage or value). As countermeasures, the distributed edge resilience enhancement program 150 may utilize a reinforced learning-based joint optimization, prior anti-jamming rules from a rule-based system, and a database or other repository as part of a direct countermeasure plan.

The distributed edge resilience enhancement program 150 may determine to pre-emptively secure other uses against jamming if the distributed edge resilience enhancement program 150 predicts that the jammer may switch targets, is moving, or other users are moving towards the jammer. In one or more embodiments, the adversarial jammer may be traveling and, thus, the distributed edge resilience enhancement program 150 may track the adversarial jammer through one or more tracking methods, such as, but not limited to, triangulation and multilateration, angle of arrival, time difference of arrival, radio frequency fingerprinting, power mapping and signal environment analysis.

Triangulation and multilateration may measure a signal strength or time of arrival of the jamming signal from multiple known locations (e.g., base stations or sensor nodes) and the position of the jammer can be estimated. The distributed edge resilience enhancement program 150 may compare the signal strength or the precise time it takes for the signal to reach different receivers to identify the source of the jamming. For more accurate results, the distributed edge resilience enhancement program 150 may utilize advanced algorithms that account for environmental factors and signal propagation models.

Angle of arrival may involve determining the angle at with the jamming signal arrives at a receiver equipped with multiple antennas, such as those employing MIMO technology. By analyzing the phase difference of the incoming signal across different antenna elements, the distributed edge resilience enhancement program 150 may estimate the angle of arrival. Combining angle of arrival measurements from multiple locations further refines the jammer's location estimation.

Time difference of arrival may relate to the difference in arrival times of the jamming signal at various receivers to estimate the jammer's location. The distributed edge resilience enhancement program 150 may utilize precise synchronization between receiving stations to measure the time differences accurately. The intersection of hyperbolic curves formed by these time differences may pinpoint the jammer's location.

Radio frequency fingerprinting relates to identifying a jammer based on its signal characteristics. If a jammer has been active for some time or has been detected previously, its signal characteristics (e.g., frequency, modulation pattern, and transient behaviors) can be used to identify and locate it when it becomes active again. Radio frequency fingerprinting may involve creating a database of known jammers and their signal fingerprints. Advanced signal processing techniques can then match observed jamming signals to this database, aiding in localization if the jammer's position was previous known or estimated.

Power mapping and signal environment analysis may create a detailed map of signal strength across the network under normal conditions which allows for the identification of anomalies caused by a jammer. By continuously updating this map, changes in the signal environment can lead to the detection and localization of new jammers. The distributed edge resilience enhancement program 150 may utilize existing network infrastructure, such as cell towers and MEC devices, to monitor the network's signal environment continually. Anomalies detected in this environment, attributed to jamming, can be analyzed to estimate the location of the source.

The distributed edge resilience enhancement program 150 may also utilize other data integration techniques, such as cross-layer information and collaboration and data fusion. Cross-layer information may relate to combining data from different OSI layers to enhance accuracy. For example, discrepancies in physical layer signal measurements and unexpected network layer traffic patterns can corroborate the presence and location of a jammer. Additionally, collaboration and data fusion may relate to sharing information between different network elements (e.g., base stations) and employing data fusion algorithms to improve localization accuracy. This collaborative approach allows for a more comprehensive view of the network, aiding in the detection and localization of jammer.

Then, at 208, the distributed edge resilience enhancement program 150 performs the action. The distributed edge resilience enhancement program 150 may implement the action suggested by the decision module as part of a cellular scheduling in an existing cloud radio access network (C-RAN), a network function virtualization (NFV), or other sub-systems. Furthermore, the distributed edge resilience enhancement program 150 may provide feedback to a user of the edge network and/or application layer.

Figure 3:
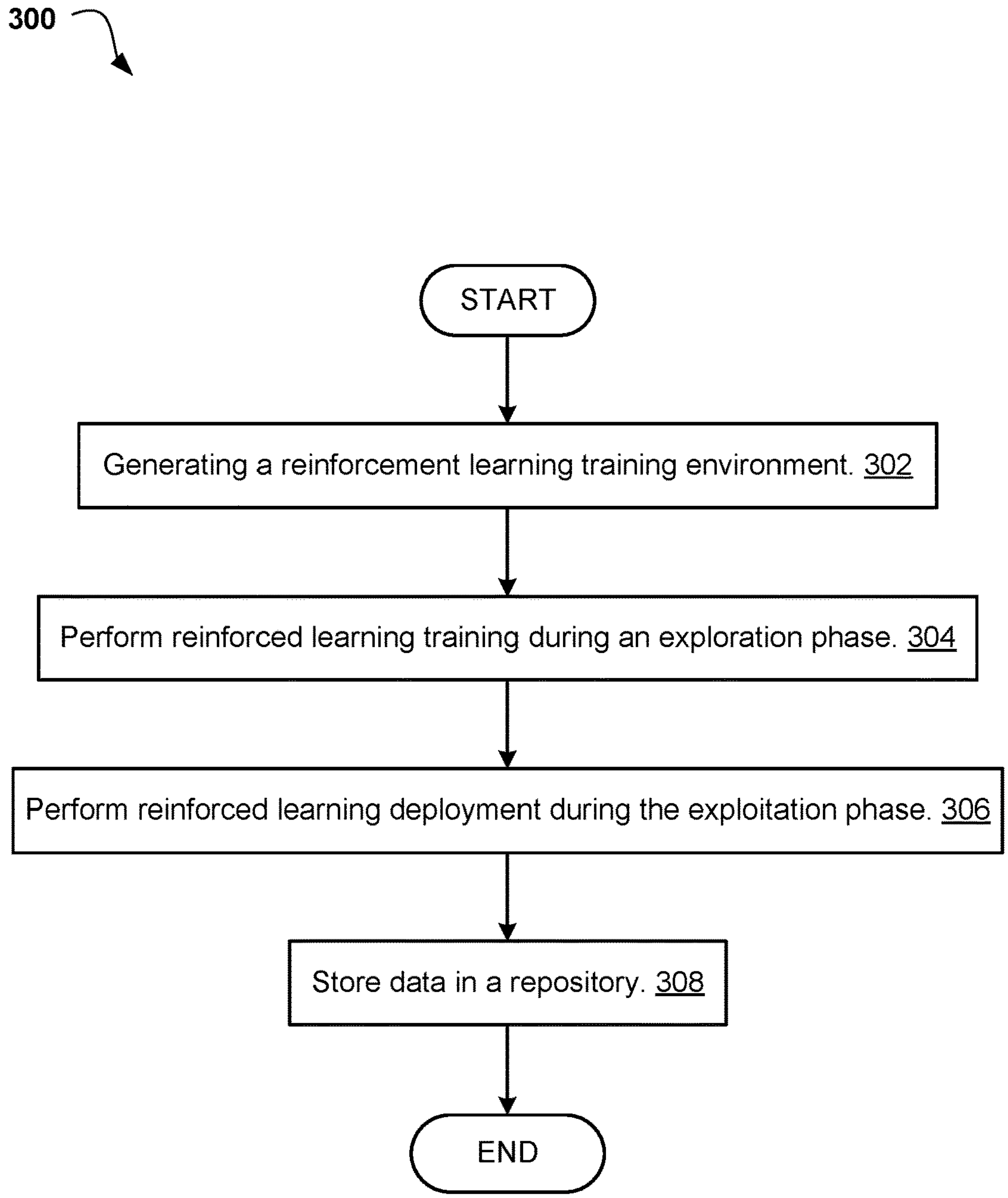
FIG. 3 illustrates an operational flowchart for a reinforced learning-based joint artificial intelligence and physical layer optimization process according to at least one embodiment.

Referring now to FIG. 3, an operational flowchart for a reinforced learning-based joint artificial intelligence and physical layer optimization process 300 is depicted according to at least one embodiment. The distributed edge resilience enhancement program 150 may optimize machine learning and physical layer system parameters to resist active jamming attacks. The distributed edge resilience enhancement program 150 may utilize information about the machine learning task to optimize the machine learning process including, but not limited to, model architecture, input/output data distribute, loss functions, and other relevant system parameters. The distributed edge resilience enhancement program 150 may also utilize information about the physical layer system parameters during the optimization process including, but not limited to, beamforming, scheduling, power allocation, and wireless resource allocation. Additionally, the distributed edge resilience enhancement program 150 may train, infer, and fine tune a reinforced learning-based optimization system given system capabilities, resources, and computing power.

At 302, the distributed edge resilience enhancement program 150 generates a reinforcement learning training environment. When generating the reinforcement learning training environment, the distributed edge resilience enhancement program 150 may consider classical architecture and/or a task specific machine learning model for performance metrics such as accuracy, loss, F1 scores, etc. on which to optimize. Furthermore, the distributed edge resilience enhancement program 150 may construct the reinforcement learning state space by including current information about the model and physical layer, such as current model accuracy, signal-to-noise ratio (SNR), signal-to-interference-plus-noise ratio (SINR), bit error rate (BER), modulation schemes, power level, and resource allocation. The distributed edge resilience enhancement program 150 may construct the reinforcement learning action space by including the potential adjustments to the physical layer, such as changing the modulation scheme, power level, resource allocation, and beamforming, as well as adjustments to the machine learning training, such as learning rate and dropout rate. During the training process, the distributed edge resilience enhancement program 150 may refer to a set of existing rules, physical limitations of the environment, or other bounds when constructing the rules and polices of the training environment.

Then, at 304, the distributed edge resilience enhancement program 150 performs reinforced learning training during an exploration phase. The exploration phase may represent actual operation of the distributed edge resilience enhancement program 150 in an edge computing environment while the distributed edge resilience enhancement program 150 learns from actual instances of adversarial jamming in a real-world environment. The distributed edge resilience enhancement program 150 may implement Q-learning, deep Q networks, or other state-action-reward-based reinforced learning techniques. Additionally, the distributed edge resilience enhancement program 150 may utilize epsilon-greedy to ensure exploration and exploitation balance. In one or more embodiments, the distributed edge resilience enhancement program 150 may train using historical data, in addition to or alternatively to performing an exploration phase in a real-world, deployed environment; synthesized systems; simulations; or on a basis of scenarios inspired by system experts. Furthermore, the distributed edge resilience enhancement program 150 may implement potential for re-training, fine-tuning, and implementation of expert knowledge and/or new system specific boundaries.

Next, at 306, the distributed edge resilience enhancement program 150 performs reinforced learning deployment during the exploitation phase. Upon completion of training, the distributed edge resilience enhancement program 150 may deploy to an edge environment during an exploitation phase. The deployment may include the direct application of actions to the actual system. Additionally, the deployment may include monitoring of system performance (e.g., wireless performance and artificial intelligence performance). In one or more embodiments, the exploitation phase relates to operation of the model in a fully deployed and operable environment so the model may use the information gleaned from a training phase.

Then, at 308, the distributed edge resilience enhancement program 150 stores the data in a repository. The distributed edge resilience enhancement program 150 may store rules, policies, metadata, and other historical data in a repository, such as storage 124, for quick reference and application in future scenarios as well as providing the capability to federate rules and policies with the outcomes of other cellular base stations within a productization and product improvement setup.

Figure 4:
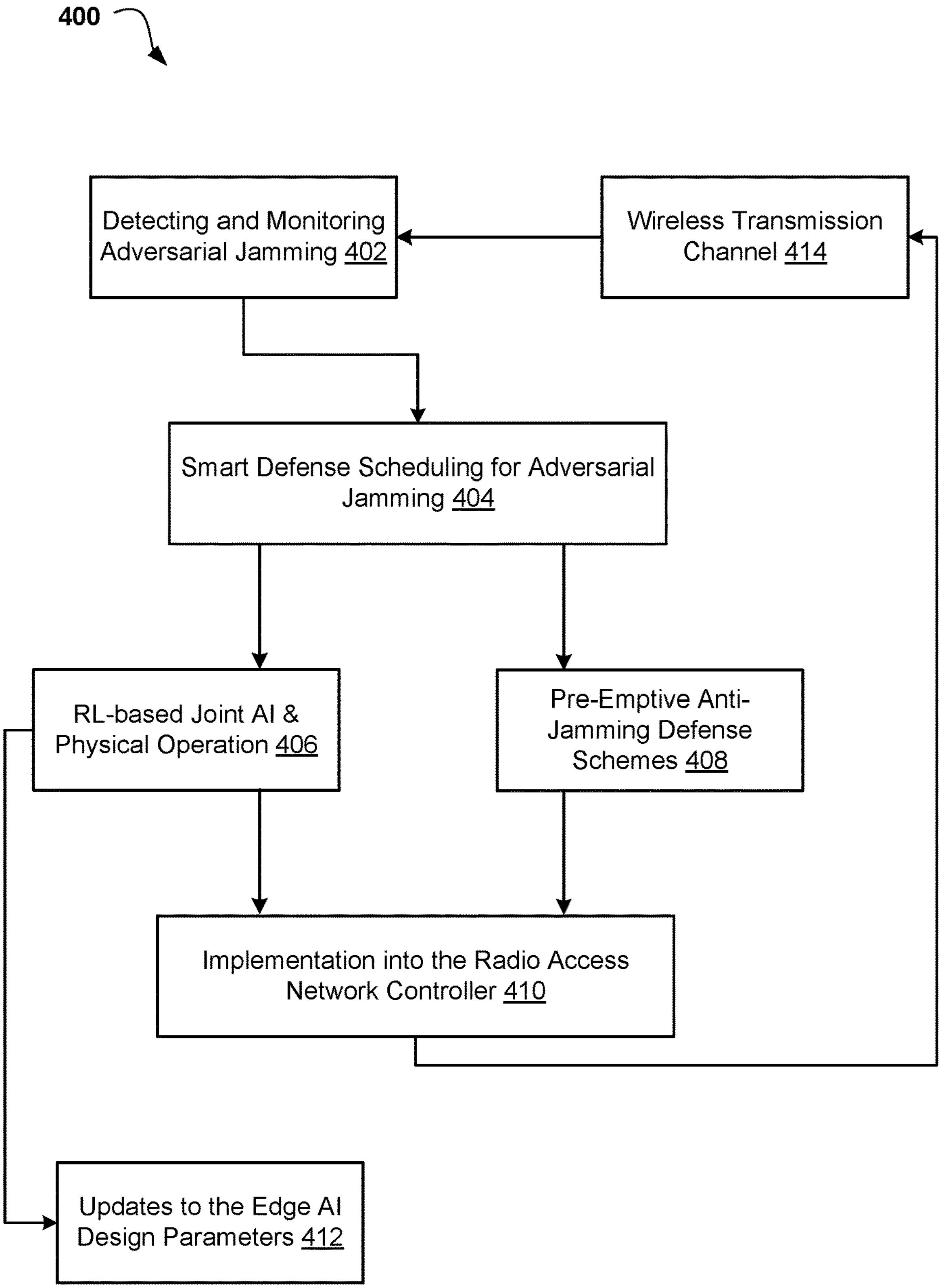
FIG. 4 illustrates a functional block diagram of an end-to-end workflow for smart defense scheduling for adversarial jamming according to at least one embodiment.

Referring now to FIG. 4, a functional block diagram of an end-to-end workflow 400 for smart defense scheduling for adversarial jamming is depicted according to at least one embodiment. The distributed edge resilience enhancement program 150 may, at 402, detect and monitor a wireless system for adversarial jamming. The distributed edge resilience enhancement program 150 may perform a probability mapping of each user's likelihood of being attacked and, at 404, perform smart defense scheduling for adversarial jamming. Depending on whether immediate urgency or precautionary urgency are deemed appropriate from the smart defense scheduling, the distributed edge resilience enhancement program 150 may perform, at 406, reinforced learning-based joint artificial intelligence and physical optimization (for cases of immediate urgency) or, at 408, pre-emptive anti-jamming defense schemes (for pre-cautionary urgency). The distributed edge resilience enhancement program 150 may then transmit reinforced learning-based joint artificial intelligence and physical optimization design parameters or cognitive radio enabled pre-emptive protection schemes for implementation into the radio access network controller, at 410. For reinforcement learning-based joint artificial intelligence and physical optimization, the distributed edge resilience enhancement program 150 may, at 412, also update the edge artificial intelligence design parameters. The distributed edge resilience enhancement program 150 may then fulfill the implementation by transmitting the updates to the base station through wireless transmission channel 414.

It may be appreciated that FIGS. 2-4 provide only an illustration of one implementation and do not imply any limitations with regard to how different embodiments may be implemented. Many modifications to the depicted environments may be made based on design and implementation requirements. For example, the distributed edge resilience enhancement program 150 may proactively safeguard a distributed cellular artificial intelligence system against jammers by employing various cognitive radio techniques. Given the capability to adapt wireless system parameters including scheduling beamforming, power allocation, resource allocation, selection of frequency bands, and dynamic spectrum access; access to various cognitive radio techniques; and signaling by the various smart defense scheduling decision module to apply pre-emptive anti-jamming strategies, the distributed edge resilience enhancement program 150 may implement pre-emptive anti-jamming defense schemes through selection of various cognitive radio techniques to change, adapt, and improve spectrum access in order to avoid being targeted by the jammer.

In an embodiment, the distributed edge resilience enhancement program 150 may perform frequency band switching via dynamic spectrum access (DSA). During frequency band switching, the distributed edge resilience enhancement program 150 may move away from a specific frequency band target by the jammer, which may cease the effects of the attack. The distributed edge resilience enhancement program 150 may utilize spectrum sensing to monitor the spectrum and detect vacant frequency bands via advanced sensing techniques, such as energy detection, matched filter detection, and cyclostationary feature detection. The distributed edge resilience enhancement program 150 may include decisions based on the spectrum sensing results to determine the best, or most appropriate, frequency band with respect to interference and anti-jamming and may be augmented by machine learning-based algorithms, such as decision trees, support vector machines, or neural networks trained on historical data, current network traffic, and available jammer behavior patterns. Additionally, the distributed edge resilience enhancement program 150 may utilize spectrum sharing in situations where vacant frequency bands are limited to design protocols which allow for multiple secondary users to share available bands without interference, such as time, frequency, or code division techniques. Furthermore, in or more embodiments, the distributed edge resilience enhancement program 150 may utilize spectrum mobility in situations where a primary user becomes active in a band and/or if jamming is detected or predicted to happen in a currently located band.

In another embodiment, the distributed edge resilience enhancement program 150 may transition between frequency bands via frequency hopping spread spectrum. The distributed edge resilience enhancement program 150 may dynamically transition between frequencies based on a pseudorandom sequence so as to avoid being jammed on a particular frequency band. The distributed edge resilience enhancement program 150 may utilize channel profiling techniques to continuously monitor available frequency bands and to profile metrics, such as SNR, BER, and latency, in order to determine suitable frequency channels as well as to continue providing quality of service for machine learning training. Additionally, the distributed edge resilience enhancement program 150 may apply dynamic adaptation techniques to change the pseudo random sequence in cases where a particular channel is identified as compromised or of poor quality. The distributed edge resilience enhancement program 150 may further provide continuous feedback from channel profiling, or other system monitoring techniques, to improve quality and methodology for machine learning.

In one or more other embodiments, the distributed edge resilience enhancement program 150 may implement other pre-emptive anti-jamming actions including utilizing edge caching in 5G networks to cache important machine learning data and allow for delaying model training in cases where jamming cannot be avoided due to other cognitive radio methods not being effective or available. As another pre-emptive, anti-jamming defensive action, the distributed edge resilience enhancement program 150 may observe user mobility patterns to provide a predictive analysis in order to anticipate potential jammer encounters and adjust communication parameters proactively. Furthermore, the distributed edge resilience enhancement program 150 may further implement geofencing and other location-based services as another anti-jamming defense to identify areas of high jamming activity and effectively geofence those areas in order to pre-emptively alert edge users and/or apply alternative communication methods. A resilient anti-jamming signal design may allow the distributed edge resilience enhancement program 150 to provide jamming resilience by optimal multiple-input and multiple-output (MIMO) signal processing and implement anti-jamming filters when knowledge about jamming signal properties is available, such as knowledge about covariance matrices due to extensive jammer observation and expert knowledge.

The distributed edge resilience enhancement program 150 may choose which pre-emptive, anti-jamming defense to apply based on one or more criteria, such as, but not limited to, the availability of resources at the cellular base station scheduler, the possibility of applying the defense method in the presence of other cognitive radio services, the urgency of the proactive anti-jamming request. Furthermore, the distributed edge resilience enhancement program 150 may implement the pre-emptive, anti-jamming defense as a rule-based system based on historical data and/or as part of a communication protocol, network functions virtualization (NFV) service, or mobile network operator strategy.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

identifying an adversarial jammer is causing an impact on a wireless system;

generating a risk assessment of impact caused by the adversarial jammer to a user, wherein the generating further comprises:

constructing an threat model comprising jammer characteristics, user distribution and mobility, network characteristics, and vulnerability points; and calculating attack probability using temporal and spatial likelihood, network exposure, and adaptive behaviors of the adversarial jammer and the wireless system;

identifying an action to apply based on the risk assessment; and performing the identified action.

2. The method of claim 1, further comprising:

generating a reinforcement learning, artificial intelligence training environment;

performing reinforcement learning, artificial intelligence training during an exploration phase; and performing reinforcement learning, artificial intelligence deployment during an exploitation phase.

3. The method of claim 1, wherein identifying the adversarial jammer further comprises;

generating a preliminary characterization of the adversarial jammer based on a detected effect on the wireless system caused by the adversarial jammer.

4. The method of claim 1, wherein the risk assessment considers an attack probability to a user utilizing the wireless system, adversarial jammer strength, task priority determined through machine learning of prior attacks, and task responsibility determined through machine learning of prior attacks.

5. The method of claim 1, wherein the action is identified through a rule-based system or a reinforced learning-based agent.

6. The method of claim 1, wherein the action is selected from a group consisting of delaying training, applying countermeasures, pre-emptively secure users, and continue as is.

7. The method of claim 2, further comprising:

storing data from the reinforcement learning, artificial intelligence training and reinforcement learning, artificial intelligence deployment in a repository, wherein the data is selected from a group consisting of rules, policies, metadata, and other historical data.

8. A computer system comprising: a processor set; one or more computer-readable storage media; and program instructions stored on the one or more non-transitory computer-readable storage media to cause the processor set to perform operations comprising: identifying an adversarial jammer is causing an impact on a wireless system; generating a risk assessment of impact caused by the adversarial jammer to a user, wherein the generating further comprises: constructing a threat model comprising jammer characteristics, user distribution and mobility, network characteristics, and vulnerability points; and calculating attack probability using temporal and spatial likelihood, network exposure, and adaptive behaviors of the adversarial jammer and the wireless system; identifying an action to apply based on the risk assessment; and performing the identified action.

9. The computer system of claim 8, further comprising:

generating a reinforcement learning, artificial intelligence training environment;

performing reinforcement learning, artificial intelligence training during an exploration phase; and performing reinforcement learning, artificial intelligence deployment during an exploitation phase.

10. The computer system of claim 8, wherein identifying the adversarial jammer further comprises;

generating a preliminary characterization of the adversarial jammer based on a detected effect on the wireless system caused by the adversarial jammer.

11. The computer system of claim 8, wherein the risk assessment considers an attack probability to a user utilizing the wireless system, adversarial jammer strength, task priority determined through machine learning of prior attacks, and task responsibility determined through machine learning of prior attacks.

12. The computer system of claim 8, wherein the action is identified through a rule-based system or a reinforced learning-based agent.

13. The computer system of claim 8, wherein the action is selected from a group consisting of delaying training, applying countermeasures, pre-emptively secure users, and continue as is.

14. The computer system of claim 9, further comprising:

storing data from the reinforcement learning, artificial intelligence training and reinforcement learning, artificial intelligence deployment in a repository, wherein the data is selected from a group consisting of rules, policies, metadata, and other historical data.

15. A computer program product comprising: one or more non-transitory computer-readable storage media; and program instructions stored on the one or more computer-readable storage media to perform operations comprising: identifying an adversarial jammer is causing an impact on a wireless system; generating a risk assessment of impact caused by the adversarial jammer to a user, wherein the generating further comprises: constructing a threat model comprising jammer characteristics, user distribution and mobility, network characteristics, and vulnerability points; and calculating attack probability using temporal and spatial likelihood, network exposure, and adaptive behaviors of the adversarial jammer and the wireless system; identifying an action to apply based on the risk assessment; and performing the identified action.

16. The computer program product of claim 15, further comprising:

generating a reinforcement learning, artificial intelligence training environment;

performing reinforcement learning, artificial intelligence training during an exploration phase; and performing reinforcement learning, artificial intelligence deployment during an exploitation phase.

17. The computer program product of claim 15, wherein identifying the adversarial jammer further comprises;

generating a preliminary characterization of the adversarial jammer based on a detected effect on the wireless system caused by the adversarial jammer.

18. The computer program product of claim 15, wherein the risk assessment considers an attack probability to a user utilizing the wireless system, adversarial jammer strength, task priority determined through machine learning of prior attacks, and task responsibility determined through machine learning of prior attacks.

19. The computer program product of claim 15, wherein the action is identified through a rule-based system or a reinforced learning-based agent.

20. The computer program product of claim 15, wherein the action is selected from a group consisting of delaying training, applying countermeasures, pre-emptively secure users, and continue as is.

* * * * *